(No Model.)
C. A. AMELANG.
HORSE STOPPING DEVICE.
No. 431,309. Patented July 1, 1890.
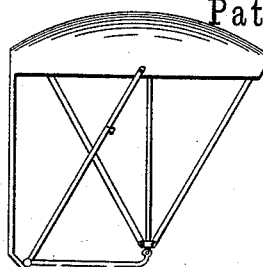
Fig 1.
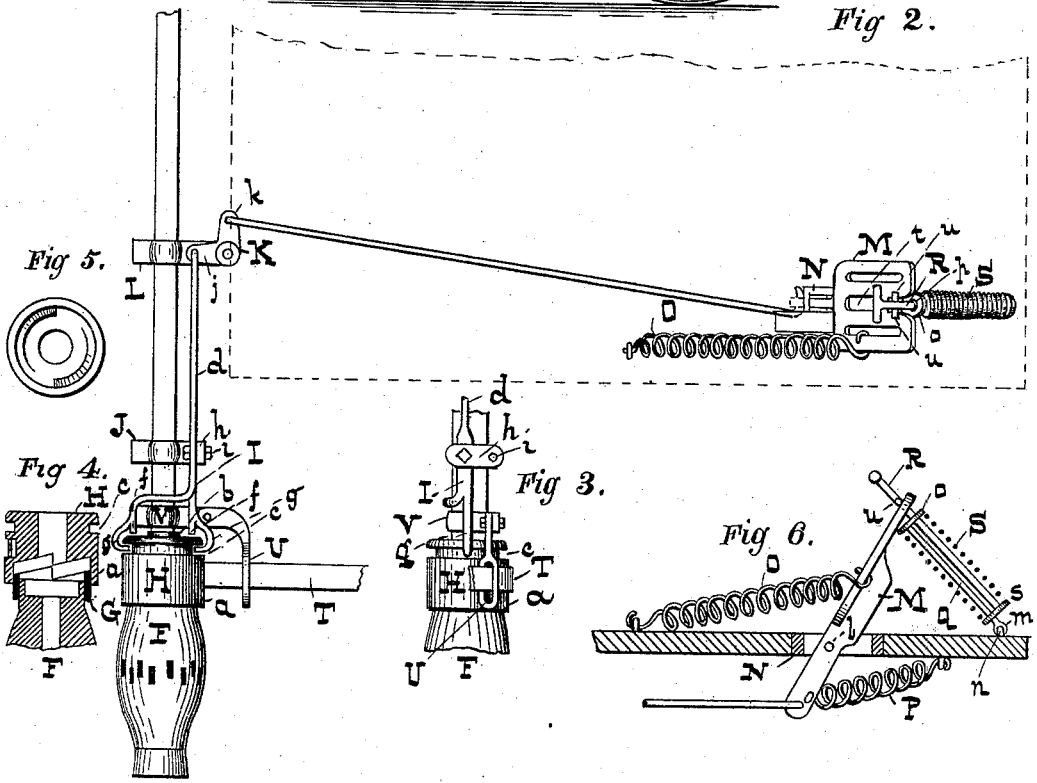
WITNESSES
Dan'l Fisher
[signature]
INVENTOR
Charles A. Amelang,
by [signature]
Atty.
THE NORRIS PETERS CO., PHOTO-LITHO., WASHINGTON, D. C.

UNITED STATES PATENT OFFICE.

CHARLES A. AMELANG, OF BALTIMORE, MARYLAND.

HORSE-STOPPING DEVICE.

SPECIFICATION forming part of Letters Patent No. 431,309, dated July 1, 1890.

Application filed June 18, 1889. Serial No. 314,729. (No model.)

*To all whom it may concern:*

Be it known that I, CHARLES A. AMELANG, of the city of Baltimore, in the State of Maryland, have invented certain Improvements in Devices for Stopping and Holding Horses Attached to Carriages, of which the following is a specification.

This invention, in common with others of its class, is for the purpose of stopping runaway and securing standing horses, and also for training of colts and correcting the habit of running off in vicious horses, as will hereinafter fully appear.

The said invention consists in the combination of devices hereinafter described, and pointed out in the claims.

In the description of the said invention which follows reference is made to the accompanying drawings, forming a part hereof, and in which—

Figure 1 is an exterior side view of a buggy to which my invention is applied, and Fig. 2 a top view of a portion of the carriage and the invention on an enlarged scale. Fig. 3 is a side view of a portion of the devices shown in Fig. 2, and Fig. 4 a sectional view of a part of the same. Fig. 5 is an inside view of a part of Fig. 4, and Fig. 6 a side view of a portion of Fig. 2.

Similar letters of reference indicate similar parts in all the figures.

In the said drawings, A represents the body of the vehicle, and B and C, respectively, the front and rear axles.

The front and rear wheels are denoted by D and E.

The hub F of one of the rear wheels is provided with a cap G at its inner end, which is toothed on its outer face, as shown in Fig. 4. The number of teeth or depressions in the surface of the cap is unimportant; but it is believed that two, diametrically arranged, will answer the purpose.

H is a clutch having a flange $a$, which fits loosely over the end of the hub. (See Figs. 2, 3, and 4.) In order that the clutch may slide smoothly on the axle, the same is provided with a sleeve $b$, secured in any suitable manner over the same. The inner end of the clutch is provided with a groove $c$, into which the ends of the shifter I rest. This shifter is formed of a single bar $d$, with branches $f$ and $g$, the former coming in contact with the face of the clutch and the latter resting in the groove $c$. The bar $d$ is pivoted to a small arm $h$, adapted to rock on a bolt or pin $i$ on the clip J, and its end is hooked through a hole in one arm $j$ of a bell-crank K, pivoted to the clip L. The other arm $k$ of the bell-crank is connected to a treadle M, pivoted at $l$ to a bracket N, fastened to the bottom of the carriage and immediately in the rear of the front. (See Fig. 1.) Springs O and P serve to retain the treadle in a backward position, and through it the clutch out of gear with the face of the hub.

Q and R are rods, the former having an eye $m$, which is attached to a staple $n$ in the bottom of the carriage. It also has a plate $o$ at its upper end provided with a hole $p$, through which the rod R passes. The rod R has a plate $s$, which is similar to that $o$ of the rod Q, and through this plate the rod Q passes. Between these plates and wound around the two rods R and Q is a spiral spring S, which, as the rods are distended, is compressed between them. The rod R is adapted to be forced longitudinally of a slot $t$ in the treadle M when it is desired to hold the said treadle forward, so as to keep the clutch in gear with the face of the hub, and to allow of this the said rod is fitted with the projections $u$, which come against the face of the treadle. The upper end of the rod R is formed into a handle, by means of which the two rods and the spring may be moved forward and backward, as desired.

A strap T is attached to the clutch H, the outer surface of which is adapted as a winding-drum and leads to the bit in the horse's mouth. The strap is guided near to the clutch by means of a slotted bracket U, which projects from the clip V. It will be seen that in view of the teeth of the clutch being of the saw-tooth description the vehicle is susceptible of being moved backward without the clutch being operative. Under ordinary circumstances the rods Q and R are not used and the springs O and P retain the treadle in its backward position and the clutch from contact with the face of the hub. Supposing all these parts to be relatively situated as described and the horse runs off, the occupant of the carriage places his foot on the treadle and forces it forward, which throws the teeth of the clutch into gear with the face of the hub and the strap is wound around the outside of the clutch and the horse stopped. When the carriage is left without an occupant, the rod R is drawn through the slot *t* in the treadle when the clutch is held yieldingly in contact with the face of the hub, and the strap is drawn back by its being wound on the clutch if the horse attempts to move in a forward direction. It will be seen from the form of the teeth in the clutch that backward motion of the vehicle is not interfered with, and this peculiarity of the apparatus is soon noticed by horses, which, when checked by the winding of the strap T, back, so that they may be released from the strain. It is found that this feature adapts the invention to the training of colts, which, under its restraint, are soon taught to not become unmanageable.

Vicious horses may by this invention be reclaimed and made serviceable, and principally from the cause that they soon find that in retreating to the spot from which they started they are released from the annoyance of the tight strap.

I claim as my invention—

1. In a device for stopping and holding horses, the combination, with the hub of one of the rear wheels of a carriage having teeth of the saw-tooth description, of a clutch with similar teeth on its face and having at one end a flange adapted as a winding-drum and to project over the end of the said hub, and at the other end an annular groove, a shifting-bar having branches resting in said annular groove, a strap leading from the winding-drum to the horse's bit, and means, substantially as described, for operating the shifting-bar, as and for the purpose specified.

2. In a device for stopping and holding horses, the combination, with the axle of a vehicle and the hub of one of its wheels, said hub having teeth on its inner edge, of a clutch movable on the axle longitudinally and having teeth on its face adapted to engage the teeth on the hub, a bell-crank pivoted on the axle, a shifter, one end of which loosely engages the clutch, its other end being connected to one arm of the bell-crank, a treadle pivoted to the front portion of the vehicle, a rod leading from the other arm of the bell-crank to said treadle, and springs to hold the treadle in a backward position, substantially as and for the purpose specified.

3. In a device for stopping and holding horses, the combination, with a treadle pivoted to a vehicle, a spring to hold said treadle in a backward position, and a rod leading from the treadle to clutch mechanism, as described, of a detachable spring-lever adapted to engage the treadle and hold it in a forward position to maintain the clutch mechanism in an operative condition, substantially as and for the purpose specified.

4. In a device for stopping and holding horses, the combination, with a treadle pivoted to a vehicle, a spring to hold said treadle in a backward position, and a rod leading from the treadle to clutch mechanism, as described, of a device for holding said treadle in a forward position, said device consisting of two rods, one of which is hinged to the vehicle, the other having projections adapted to engage the treadle, the two rods overlapping and being parallel to each other and carrying at their opposite ends perforated plates, each rod passing through the rod carried by the other, and a spiral spring surrounding said rods and confined endwise between the said plates, substantially as and for the purpose specified.

CHARLES A. AMELANG.

Witnesses:
WM. T. HOWARD,
DANL. FISHER.